(12) United States Patent
McConnell et al.

(10) Patent No.: US 7,409,438 B2
(45) Date of Patent: Aug. 5, 2008

(54) METHODS, SYSTEMS, AND COMPUTER-READABLE MEDIA FOR DISPLAYING HIGH RESOLUTION CONTENT RELATED TO THE EXPLORATION AND PRODUCTION OF GEOLOGIC RESOURCES IN A THIN CLIENT COMPUTER NETWORK

(75) Inventors: Jane Elizabeth McConnell, Cobham (GB); David Michael Holmes, Guilford (GB); Raymond Pruill Blalock, Frankston, TX (US); Donald Hugh Dunbar, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 11/970,260

(22) Filed: Jan. 7, 2008

(65) Prior Publication Data

US 2008/0104168 A1    May 1, 2008

Related U.S. Application Data

(63) Continuation of application No. 11/431,781, filed on May 10, 2006.

(51) Int. Cl.
G06F 13/00 (2006.01)

(52) U.S. Cl. .................. 709/219; 709/203; 709/226; 719/328

(58) Field of Classification Search .......... 709/203, 709/217, 219, 223, 227, 229, 226; 718/104, 718/105; 719/328, 329
See application file for complete search history.

(56) References Cited

U.S. PATENT DOCUMENTS

| | | | |
|---|---|---|---|
| 6,747,655 B2 * | 6/2004 | Ono et al. ............. | 345/502 |
| 6,854,009 B1 | 2/2005 | Hughes | |
| 2005/0081251 A1 * | 4/2005 | Walker et al. ......... | 725/135 |
| 2005/0278389 A1 * | 12/2005 | Maze et al. .......... | 707/200 |
| 2006/0126603 A1 * | 6/2006 | Shimizu et al. ....... | 370/356 |
| 2007/0139446 A1 * | 6/2007 | Chau et al. ........... | 345/660 |

FOREIGN PATENT DOCUMENTS

EP    1411429 A2    4/2004

OTHER PUBLICATIONS

"Virtual E&P Workspace Enhances Unocal's Workforce Options," (c)2003 Landmark Graphics Corporation.

(Continued)

*Primary Examiner*—Viet Vu
(74) *Attorney, Agent, or Firm*—Merchant & Gould

(57) ABSTRACT

Methods, systems, and computer-readable media are provided for displaying high resolution content generated by a securely hosted application program for the exploration and production of geologic resources on a thin client system in a client/server computer network. A user interface is presented for accessing the application program which is hosted on a server. After the application program is selected, a least utilized node in the client/server computer network is determined for executing the selected application program via the thin client system. Images generated by the executed application program are packaged into a remote access application server display protocol and displayed as high resolution images on the thin client system. The high resolution images may be displayed on multiple displays associated with the thin client system.

11 Claims, 5 Drawing Sheets

OTHER PUBLICATIONS

Sun(TM) One Grid Engine Administration and User's Guide (c)2002.

PCT International Search Report and Opinion, mailed Dec. 12, 2007 in International Application No. PCT/US2007/011304 filed Sep. 5, 2007; 12 pages.

"Citrix MetaFrame 1.8 Backgrounder"; XP-002217973; Citrix Systems, Inc.; 34 pages, 1999.

"Administrator's Guide—Citrix MetaFrame Application Server for Windows Version 1.8"; XP-001152118; Citrix Systems, Inc.; 170 pages, 1999.

* cited by examiner

TEAM WORKSPACE

WELCOME: MEL BADHEKA WORKSPACE: 2P VERSION: TW-2003.13.2.0

LOGOUT
PROJECT: 2P

WORKSPACE
→ USER PROFILE
→ MY SIGN-ON
→ CHANGE WORKSPACE
⊞ PROJECT CONTENT
⊞ ADMINISTRATION

PROJECTS *410*
→ 2P

APPLICATIONS *420*
→ EMERALD CITY LINUX
→ POWEREXPLORER
   GOLD
⊞ GIS

WELCOME TO THE MARKETING TEAM WORKSPACE COLLABORATION SITE

THIS COMMUNITY PORTAL WILL SERVE AS THE "E-WORKSPACE™" FOR UPSTREAM PROFESSIONALS AND CONSULTANTS TO USE ON DAILY BASIS TO WORK MORE EFFICIENTLY AND EFFECTIVELY.

IT ALSO ENABLES COMPANIES BOTH LARGE AND SMALL TO REDUCE IT INFRASTRUCTURE COSTS, BETTER SHARE MASSIVE AMOUNTS OF DATA, IMPROVE DECISION-MAKING CAPABILITIES AND ENHANCE PARTNERSHIPS

OIL AND GAS NEWS

E. CHINA SEA GAS PRODUCTION COULD
→ BEGIN IN SEPT.: CNOOC
KYODO AUG 30 2005 4:11PM GMT
FREE GUIDE TO COMMODITY SECRETS -
→ SPONSORED LINK
AD-HTTP://WWW.TRADEAMERICAN.COM
AUG 30 2005 4:11PM GMT
IN OIL FIELD, THERE WILL BE WINNERS
→ HOUSTON CHRONICLE AUG 30 2005
  4:08PM GMT

HOUSTON NEWS

HOUSTON-AREA SHELTERS FILLED WITH
→ FEAR AND HOPE    HOUSTON CHRONICLE
  AUG 30 2005 12:40PM GMT

METHODS, SYSTEMS, AND COMPUTER-READABLE MEDIA FOR DISPLAYING HIGH RESOLUTION CONTENT RELATED TO THE EXPLORATION AND PRODUCTION OF GEOLOGIC RESOURCES IN A THIN CLIENT COMPUTER NETWORK

CROSS REFERENCE TO RELATED APPLICATIONS

This application is a continuation of U.S. patent application Ser. No. 11/431,781, filed on May 10, 2006, the disclosure of which is hereby incorporated herein, in its entirety, by reference.

BACKGROUND

Geophysicists and geologists utilize various software applications, which are hosted on computer networks, in connection with the exploration and production of geologic resources, such as hydrocarbons. The computer networks typically include at least two client computer systems utilized by geophysicists and geologists. One client computer may be a high end UNIX-based workstation for performing technical computing tasks related to exploration and production ("E&P"). A second client computer may be a personal computer ("PC") for performing administrative tasks such as sending electronic mail. The client workstations and PCs utilize the computer network to access applications which are hosted on multiple server computers.

Presently, multiple client computer networks utilized in E&P environments suffer from several drawbacks. One drawback is that the utilization of multiple client computers often places significant demands on often limited network resources such as bandwidth, requiring megabit networks, for example, to be upgraded to gigabit networks at additional cost. Another drawback with present networks is that a user, after selecting a server-based application from a client workstation, must wait for the application to be loaded from a remotely located server into the memory of the client workstation. Furthermore, the user would also have to wait for any data associated with the application to be loaded from a server into the memory of the client workstation before the application could be used. Yet another drawback is that when a user is running multiple applications on a workstation, the combined result of loading the applications and their associated data into memory consumes workstation resources (e.g., processor and memory resources), resulting in slower performance. Still another drawback is that while geophysicists and geologists are increasingly utilizing computer systems with multiple high resolution monitors for displaying graphics, current network applications are unable to fully utilize maximum display resolutions which may be as high as 3840×1200 on dual monitors capable of high resolution displays.

It is with respect to these considerations and others that the various embodiments of the present invention have been made.

SUMMARY

In accordance with the present invention, the above and other problems are solved by methods, systems, and computer-readable media for displaying high resolution content related to the exploration and production of geologic resources in a thin client computer network. According to one aspect of the invention, a method is provided for displaying high resolution content generated by a securely hosted application program for the exploration and production of geologic resources on a client system in a thin client/server computer network. The method includes presenting an interface for accessing the application program, the application program hosted on the server, receiving a selection of the application program, determining a least utilized node in the client/server computer network for executing the selected application program via the client system, packaging images generated by the executed application program into a remote access application server display protocol, and displaying the images generated by the executed application program via the remote access application server display protocol as high resolution images on the client system. The high resolution displays may be displayed on multiple (e.g., dual monitors) displays associated with the client system.

The invention may be also implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DESCRIPTION OF THE DRAWINGS

FIG. 4 is a computer generated display for selecting a suite of applications in the computer network of FIG. 1, according to an illustrative embodiment of the present invention.

DETAILED DESCRIPTION

Figure 1:
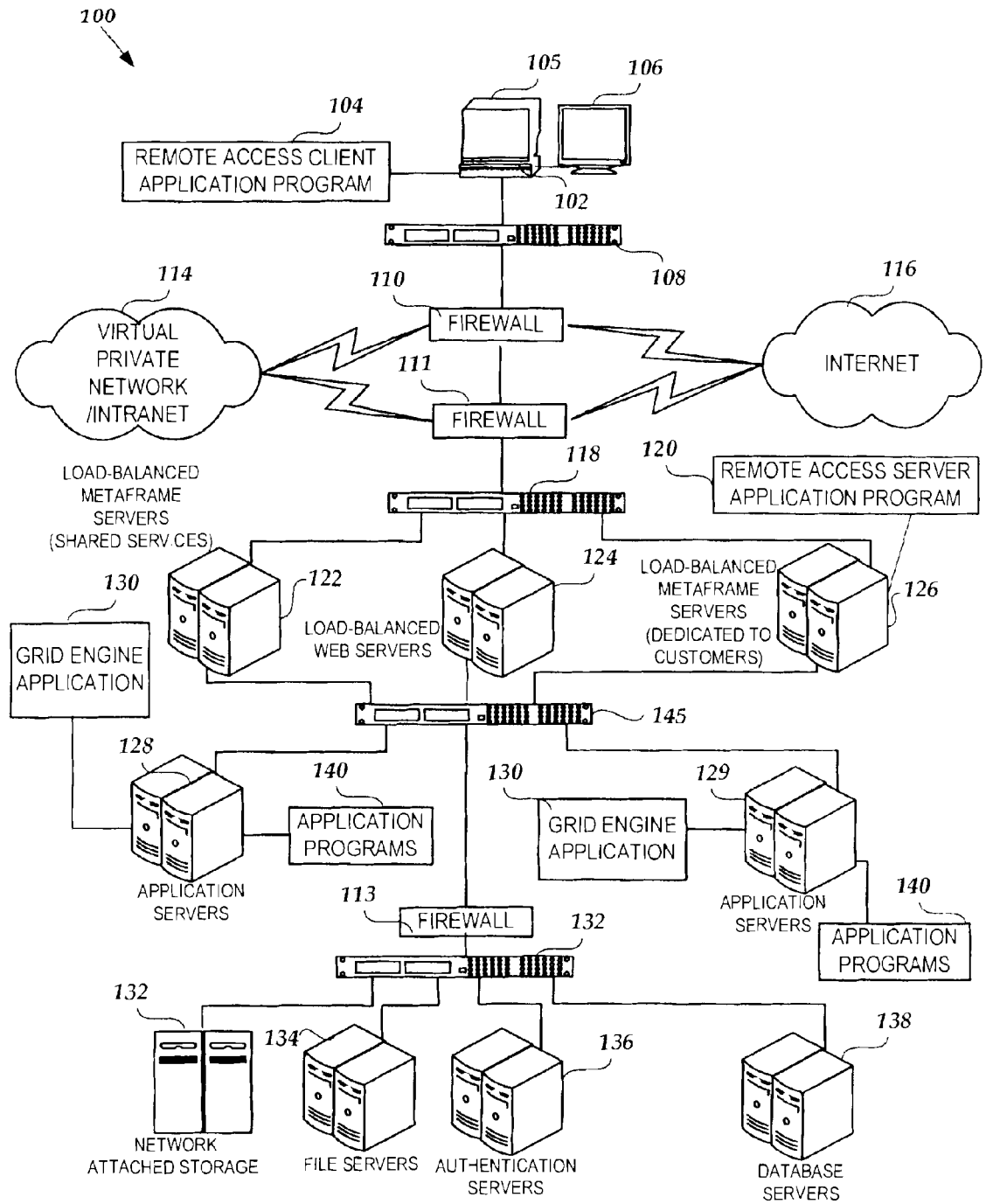
FIG. 1 is a computer network architecture diagram for implementing illustrative embodiments of the invention.

Illustrative embodiments of the present invention provide for displaying high resolution content generated by a securely hosted application program for the exploration and production of geologic resources on a client system in a client/server computer network. Referring now to the drawings, in which like numerals represent like elements, various aspects of the present invention will be described. In particular, FIG. 1 and the corresponding discussion are intended to provide a brief, general description of a suitable operating environment in which embodiments of the invention may be implemented.

Embodiments of the present invention may be generally employed in a thin client/server computer network 100 as shown in FIG. 1. The network 100 includes a thin client workstation 102 (hereinafter referred to as client workstation 102). In accordance with various illustrative embodiments of the invention, the client workstation 102 may be a conventional desktop or laptop computer including a processor, a memory, and a mass storage device (not shown) for storing and executing an operating system (not shown), and one or more application programs such as a remote access client application program 104 and a web browser (not shown). In one embodiment of the invention, the remote access client application 104 may be an Independent Computing Architecture ("ICA") protocol client application such as METAFRAME which is marketed by CITRIX SYSTEMS of Ft. Lauderdale, Fla. As is known to those skilled in the art, an ICA protocol client application enables client computers (e.g., "thin" clients) secure access to applications and storage on one or more central server computers. In one embodiment, the operating system may be the UNIX operating system. In an alternative embodiment, the operating system may be either the WINDOWS® XP or WINDOWS® 2000 operating systems, and the web browser may be the INTERNET EXPLORER web browser, all of which are marketed by MICROSOFT CORPORATION of Redmond, Wash.

The client workstation 102 also includes dual monitors 105 and 106, each monitor capable of displaying high resolution content, including graphics. For instance, in one embodiment of the invention, each of the monitors 105 and 106 may be capable of a resolution of at least 1920×1200 and 32 bit (i.e., "true") color. It should be understood that the monitors 105 and 106 are not limited to the aforementioned resolution but may be capable of higher resolutions and/or presentation formats known to those skilled in the art.

It will be appreciated that the dual monitors 105 and 106 may be driven by a dual screen capable graphics card (not shown). For instance, in one embodiment of the invention, the graphics card may be the QUADRO NVS 280 graphics card marketed by NVIDIA CORPORATION of Santa Clara, Calif.

In the network 100, client workstation 102 is connected to a router 108 which is in communication with firewalls 110 and 111. The router 108 enables secure communications between the client workstation 102 and either virtual private network/intranet 114 and/or the Internet 116. The firewalls 110 and 111 are in communication with router 118 which enables communications with load-balanced METAFRAME servers 122 utilized for shared services, load-balanced Web servers 124, and load-balanced METAFRAME servers 126 utilized for customers (i.e., clients). The functionality of routers and firewalls in a client/server computer network is well known to those skilled in the art.

As is known to those skilled in the art, servers may be run in a "load-balanced" configuration in which the servers execute custom algorithms to provide increased capacity, performance, and availability of resources. In a load-balanced server configuration, a user is directed to the server that is least busy servicing other clients based on, for example, the current number of client sessions, per session memory, CPU utilization, disk I/O (input/output), and other system resources. For instance, a user attempting to access a website hosted on one of the load-balanced web servers 124 would be automatically directed to the web server that is least busy. In one embodiment of the invention, load-balancing functionality for the servers 122, 124, and 126 is provided via the WINDOWS Load Balancing Service ("WLBS") which is incorporated in the WINDOWS 2000 ADVANCED SERVER AND WINDOWS SERVER 2003 ENTERPRISE operating systems, marketed by MICROSOFT CORPORATION of Redmond, Wash.

Each of the servers 126 also include a remote access server application program 120. In one embodiment of the invention, the remote access server application program 120 may be an Independent Computing Architecture ("ICA") protocol server application such as METAFRAME which is marketed by CITRIX SYSTEMS of Ft. Lauderdale, Fla. In various embodiments of the invention, the remote access server application program 120 is operative to display images generated by application programs 140 stored on the application servers 128 and 129, as high resolution images on the client workstation 102, via the remote access client application program 104. It will be appreciated that the remote access server application program 120 may also utilize third-party application programs (not shown) for capturing 3D graphics generated by the applications programs 140. In one embodiment, the third-party application programs may include the EXCEED® suite of application programs, marketed by HUMMINGBIRD LTD. Of Toronto, Canada, for capturing OpenGL images generated by programs running on Linux/UNIX application servers. The remote access server application program 120 will be described in greater detail below with respect to FIGS. 2-5.

It should be understood that the portion of the network 100 between the client workstation 102 and the servers 122, 124, and 126 is known as a "FrontNet." The FrontNet consists of network addresses that are routable on the Internet 116 or network addresses that first undergo Network Address Translation ("NAT") and are then routed to the Internet 116. For the client workstation 102, the FrontNet includes two parts. The first part of the FrontNet is the FrontNet Web. The FrontNet Web is a subnet running in a virtual Local Area Network ("VLAN") which is connected to a dedicated firewall interface. The Web servers 124 and all customers connect to the aforementioned subnet. The second part of the FrontNet is the FrontNet Client. The FrontNet Client is a subnet which stands apart from the FrontNet Web VLAN and consists of multiple private VLANs. Each private VLAN includes an individual customer's dedicated servers (i.e., the servers 126). The FrontNet Client enables each customer's servers to communicate with Internet 116 through a gateway or router, but prevents any customer's servers (i.e., the servers 126) from communicating with another customer's servers.

In the network 100, the servers 122, 124, and 126 are in communication through router 145 with the application servers 128 and 129. The application servers 128 and 129 host the application programs 140 which may be accessed and executed by the client workstation 102 utilizing the various components in the network 100 including the servers 122, 124, and 126, as will be described in greater detail below with respect to FIGS. 2-5. In the various embodiments of the invention, the application programs 140 may be related to the exploration and production of geologic resources (e.g., hydrocarbons). In one embodiment, the application programs 140 may include the OPENWORKS suite of application programs marketed by LANDMARK GRAPHICS CORPORATION (a wholly owned business unit of HALLIBURTON COMPANY) of Houston, Tex.

It should be understood that each of the application servers 128 and 129 may contain a "pool" of multiple servers or compute "nodes." Each compute node in each pool hosts the application programs 140. Each pool of application servers 128 and 129 also includes at least one server for storing and executing a grid engine application 130 (i.e., a grid server). In accordance with various embodiments of the invention, the grid engine applications 130 are program modules which perform real-time operations including continually monitoring the compute nodes for processor, memory, network, disk, and input/output utilization. Each requested command to invoke a process (e.g., a command from the client workstation 102 for the executing the application programs 140 is intercepted by the grid servers in the pool of application servers 128 and 129, and then based on an algorithm provided by the grid engine applications 130, the request is shunted by the grid servers to the least utilized compute node in its pool. In one embodiment, the grid engine applications 130 may be the GRID ENGINE application program marketed by SUN MICROSYSTEMS, INC. of Santa Clara, Calif. The functionality of the grid engine applications 130 will be discussed in greater detail below with respect to FIGS. 2-5.

It should be understood that the portion of the network 100 between the servers 122, 124, and 126 and the servers 128 and 129 is known as a "MiddletNet." In the network 100, the MiddleNet relays communications between the FrontNet servers (discussed above) and the network attached storage 132, file servers 134, authentication servers 136, and database servers 138. It should be understood that the MiddleNet is a secure network outside of firewall 113. The MiddleNet consists of several VLANs including one VLAN for the shared servers 122 and 124 and another VLAN for the customer dedicated servers 126. It will be appreciated that the MiddleNet enables a customer's servers to communicate with the servers 132, 134, 136, and 138 and the customer's application server pool, but prevents them from communicating with any other customer's servers.

In the network 100, the servers 128 and 129 are in communication through the firewall 113 and the router 132 with network attached storage 132, file servers 134, authentication servers 136, and database servers 138. It should be understood that the portion of the network 100 comprising the firewall 113, the router 132, and the network attached storage 132, file servers 134, authentication servers 136, and database servers 138, makeup a secure data infrastructure known as a "BackNet." It should further be understood that the BackNet accepts only certain defined network traffic, such as domain authentication or data requests. It will be appreciated that the BackNet, as a secure data infrastructure, does not completely trust network traffic from either the FrontNet or the MiddleNet, but does trust network traffic from the MiddleNet more than network traffic from the FrontNet.

It should be understood that the workstation 102 and the servers 122, 124, 126, 128, 129, 134, 136, and 138 in the network 100 for practicing embodiments of the invention may be representative of a number of computer system configurations, including, but not limited to, hand-held devices, multiprocessor systems, microprocessor-based or programmable consumer electronics, minicomputers, mainframe computers, and the like.

Figure 2:
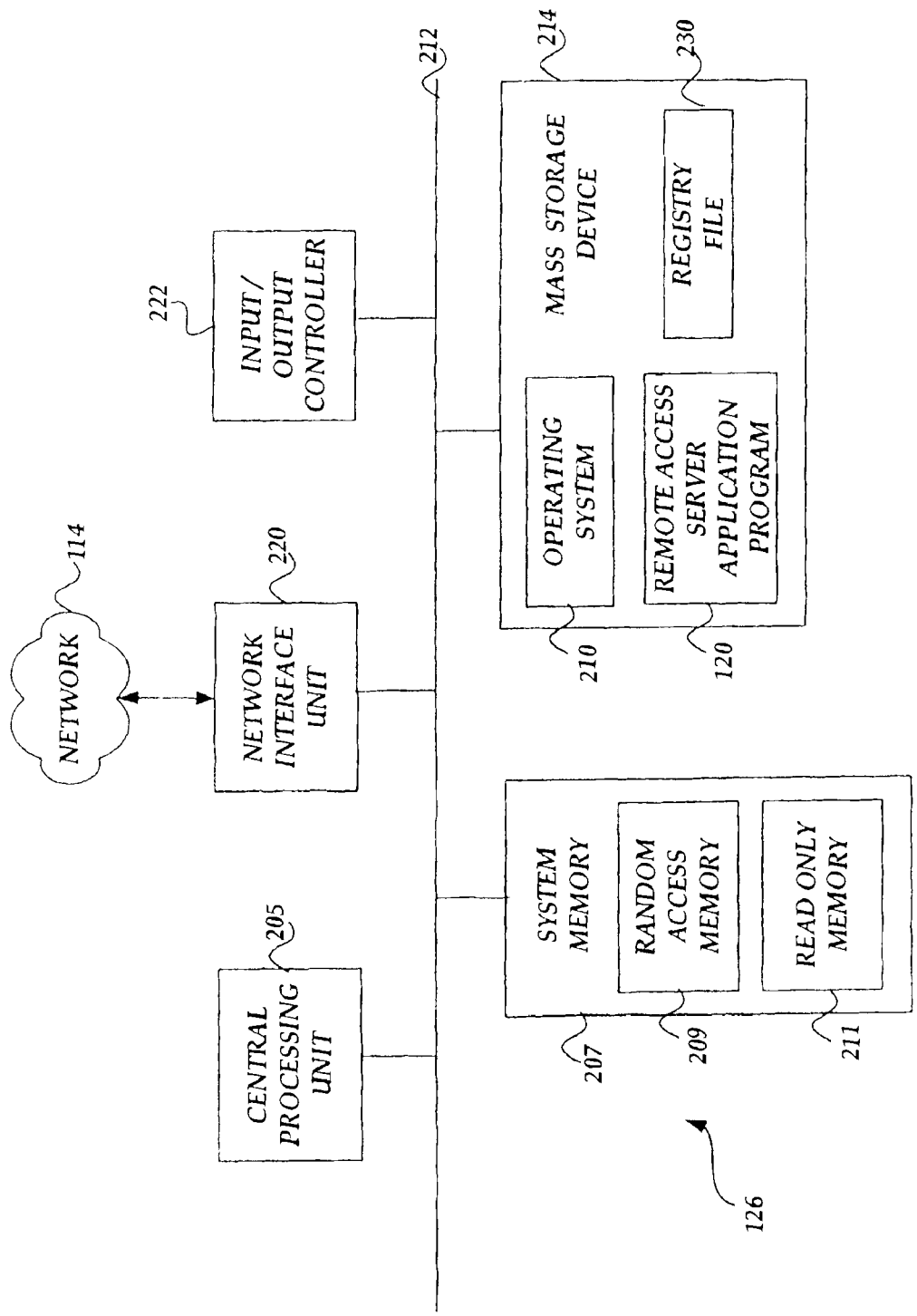
FIG. 2 is a simplified block diagram illustrating a server computer system in the computer network of FIG. 1, which may be utilized for performing various illustrative embodiments of the present invention.

Referring now to FIG. 2, an illustrative server computer architecture for a load-balanced METAFRAME server 126 which may utilized in the various embodiments of the invention, will be described. The server 126 shown in FIG. 2 includes a central processing unit 205 ("CPU"), a system memory 207, including a random access memory 209 ("RAM") and a read-only memory ("ROM") 211, and a system bus 212 that couples the memory to the CPU 205. A basic input/output system containing the basic routines that help to transfer information between elements within the server 126, such as during startup, is stored in the ROM 211. The server 126 further includes a mass storage device 214 for storing an operating system 210, the remote access server application program 120, and a registry file 230, which will be described in greater detail below.

The mass storage device 214 is connected to the CPU 205 through a mass storage controller (not shown) connected to the bus 212. The mass storage device 214 and its associated computer-readable media provide non-volatile storage for the server 126. Although the description of computer-readable media contained herein refers to a mass storage device, such as a hard disk or CD-ROM drive, it should be appreciated by those skilled in the art that computer-readable media can be any available media that can be accessed by the server 126.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Generally, program modules include routines, programs, components, data structures, and other types of structures that perform particular tasks or implement particular abstract data types. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the server 126.

The server 126 may operate in a networked environment using logical connections to remote computers, databases, and other devices through a network such as the virtual private network/intranet 114 (or alternatively the Internet 116 of FIG. 1). The server 126 may connect to the network 100 through a network interface unit 220 connected to the bus 212. The server 126 may also include an input/output controller 222 for receiving and processing input from a number of other devices, including a keyboard and mouse. Similarly, the input/output controller 222 may provide output to a display screen, a printer, or other type of output device.

As mentioned briefly above, the operating system 210, remote access server application program 120, and registry file 230 may be stored in the mass storage device 214. The operating system 210 is a program module suitable for controlling the operation of the server 126 including providing support for load-balancing functions (discussed above in the description of FIG. 1). Briefly discussed above in the description of FIG. 1, the remote access server application program 120 is operative to package images generated by a selected application program 140 into a remote access application server display protocol and display images generated by the application program 140 as high resolution images on the client workstation 102, via the remote access client application program 104. As will be discussed in greater detail below with respect to FIG. 3, the display of high resolution images by the remote access server application program 120 may be enabled by modifying one or more registry settings in the registry file 230.

It should be appreciated that the servers 122, 124, 128, 129, 134, 136, and 138 may include many of the conventional computing components illustrated in FIG. 2 and described above. It should further be appreciated that the aforementioned servers may include other conventional components not illustrated in FIG. 2 but known to those skilled in the art.

Figure 3:
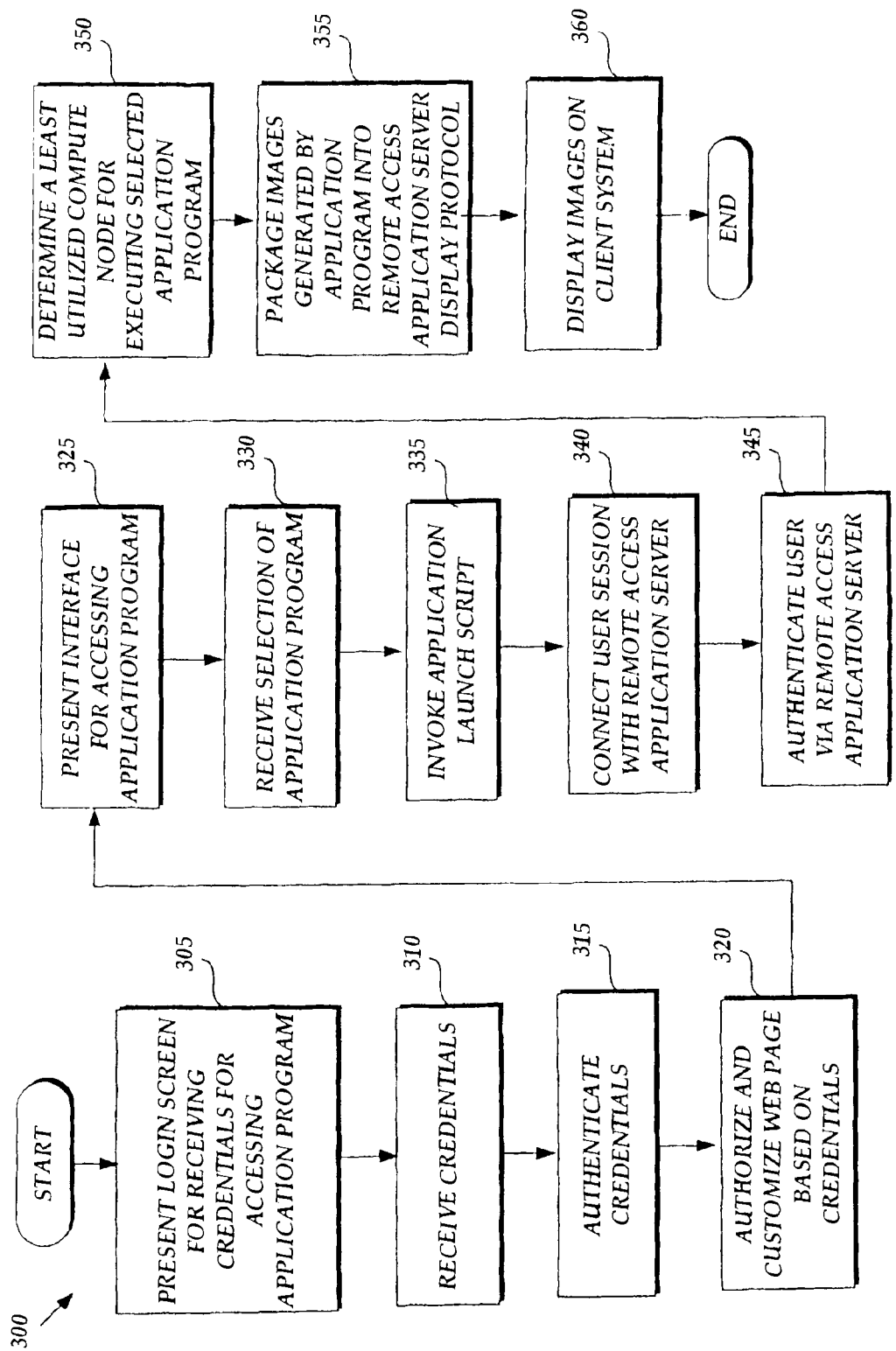
FIG. 3 is a flow diagram showing an illustrative routine for displaying high resolution content related to the exploration and production of geologic resources on a client system in the computer network of FIG. 1, according to an illustrative embodiment of the present invention.

Referring now to FIG. 3, an illustrative routine 300 will be described illustrating a process for displaying high resolution content generated by a securely hosted application program for the exploration and production of geologic resources on a client system in a client/server computer network. When reading the discussion of the illustrative routine presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 3, and making up illustrative embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The illustrative routine 300 begins at operation 305 where, in response to receiving a user request for a website hosted on the load-balanced Web server 124, the server 124 presents a login screen for receiving credentials for accessing an application program. In one embodiment, the website may present one or more exploration and production ("E&P") application programs for selection by the user. The E&P application programs may be included in the group of the application programs 140 which are stored on one of the application servers 128 or 129 in the network 100. In particular, a user may access the server 124 by logging into the operating system of the client workstation 102 and launch a web browser for navigating to a login page on the website. It should be understood that according to one embodiment, the servers 124 may be configured with Internet Protocol Security ("IPSec") policies which act as packet filters. As known to those skilled in the art, IPSec is a set of protocols for supporting the secure exchange of packets at the IP or Network layer in the Open System Interconnection ("OSI") model. It should be appreciated that the IPSec policies provide an additional layer of security, and they are configured so that only specific traffic such as http, https and ICMP are allowed into the server 124.

It will be appreciated that before the traffic (i.e., the URL for the website) from the client workstation 102 reaches the server 124, it may traverses the firewalls 110 and 111 which limit the network activity between the client workstation 102 and the server 124. As known to those skilled in the art, the firewalls may be configured to allow specific types of traffic explicitly listed in the firewall rules. It should be appreciated that requested website may require the Secure Sockets Layer ("SSL") protocol for data encryption which enables the secure communication of data between the client workstation 102 and the server 124. As known to those skilled in the art, URLs requiring SSL connections begin with the https prefix. It should be understood that in one embodiment of the invention, if a URL is entered without the https prefix, the user's unencrypted http session is re-directed into a new, encrypted https session which relies on server-side certificate based authentication.

The routine 300 continues from operation 305 to operation 310 where the website hosted on the servers 124 receives logon credentials from a user. In particular, the website may prompt a user to enter a user ID and password for accessing a webpage listing a number of E&P application programs.

The routine 300 continues from operation 310 to operation 315 where the servers 124 authenticate the user-supplied logon credentials by utilizing the authentication servers 136. Those skilled in the art should appreciate that, according to one embodiment, the servers 124 may leverage the security framework provided by directory services such as Active Directory Services ("ADS") developed by MICROSOFT CORPORATION of Redmond, Wash., in performing the authentication operation. In particular, the servers 124 may utilize the Lightweight Directory Access Protocol ("LDAP") structure within ADS to authenticate users and build the security context under which a user will operate. The protocol utilized may be the Kerberos protocol. Connectivity between the servers 124 and the directory services infrastructure may be conducted through a separate sub-network (i.e., subnet) that is logically and physically isolated from the network connecting the servers 124 and the workstation 102 (i.e., the end-user). It should be understood that the second subnet may be configured with private IP address space and is typically not directly accessible from the Internet. This subnet is typically not directly accessible from the Internet. The concept of private IP address space is defined in Request for Comments document 1918. It will be appreciated that an additional firewall may be used between the servers 124 and the directory services infrastructure (where user account information is stored) thereby providing an additional layer of network security. It will further be appreciated that using directory services, such as ADS, enables the servers 124 to utilize a private Domain Name System ("DNS") namespace thus allowing the servers 124 to remain protected from external name servers and preventing other Internet servers from "learning" or "advertising" the DNS domain to un-trusted entities.

The routine 300 continues from operation 315 to operation 320 where the servers 124 authorize and customize a web page based on the authenticated logon credentials. In particular, once the user is authenticated, the credentials are passed over to the database servers 138 for authorization. In accordance with one embodiment, the servers 138 may comprise one or more structured query language ("SQL") servers. During this process, the servers 124 may run SQL commands to validate and match the credentials to a database hosted by the servers 138. The SQL commands also customizes the user environment against the database and passes a series of variables via scripts back to the servers 124, which then generates the appropriate web page with content the user has access to see. For instance, the content may consist of a home page enabling a user to select from a number of E&P applications, data, catalogs, and maps & graphs. It should be understood that each of the E&P applications may be individualized on a per user basis. It should also be understood that the servers 124 utilize the LDAP hierarchy within the directory services (discussed above in operation 315) to perform the personalization of the "look & feel" of the customized web page based on user access, permissions, and entitlements which may be set by a system administrator. It will be appreciated that the website hosted by the servers 124 for the aforementioned logon, authentication, and authorization operations may have multiple security levels according to a role-based security structure. For instance, a security level hierarchy for a business organization may include a site administrator level (for a domain or enterprise administrator), a workspace manager level (for a webmaster, domain administrator, or team leader), a group manager level (for a business unit manager/supervisor), an editor level (for end users who can create and add content), and a user level (for end users who have read access only).

Figure 5:
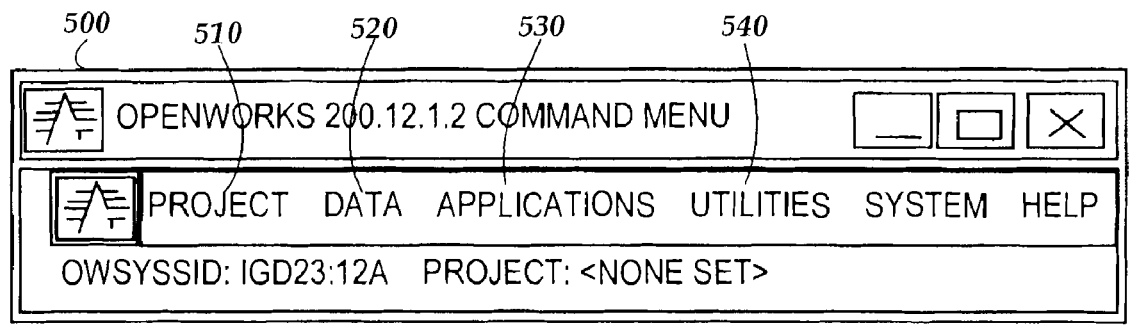
FIG. 5 is a computer generated display for selecting an application or other data from a selected suite of applications in FIG. 4 for displaying high resolution images on a client system in the computer network of FIG. 1, according to an illustrative embodiment of the present invention.

The routine 300 continues from operation 320 to operation 325, where the servers 124 present an interface for accessing a list of available application programs. In particular, once a user sees what content is available for use, the user may select an application from the list of available applications. An illustrative interface for selecting an E&P application program is shown in FIGS. 4-5, which will be described in greater detail bellow.

The routine 300 continues from operation 325 to operation 330 where the servers 124 receive a selection of an application program presented in the list of available application programs. The routine 300 then continues from operation 330 to operation 335 where, in response to receiving a selected application program, an application launch script is invoked on the servers 124. In particular, the application launch script may generate a login prompt on the client workstation 102 for accessing the environment where the selected application is being hosted (i.e., the application servers 128 and 129). In various embodiments, the application servers 128 and 129 may comprise a WINDOWS® or, alternatively, a LINUX/UNIX environment, for hosting E&P application programs. For instance, if the selected application program is a Linux/UNIX executable program, the launch script may launch the EXCEED® suite of application programs which in turn would launch the selected application program via the grid engine application 130 on an available compute node (i.e., application server). If, on the other hand, the selected application program is a WINDOWS® executable program, the launch script may launch the application directly on the load-balanced servers 126. It should be understood that after the login prompt is generated, the remote access client application program 104 is invoked on the client workstation 102. As discussed above with in the description of FIG. 1, the remote access client application program 104 may comprise the CITRIX client for the WINDOWS® operating system.

The routine 300 continues from operation 335 to operation 340 where the servers 124 establish a connection with one of the load-balanced METAFRAME servers 126. It should be appreciated that both the servers 124 and 126 are "dual-homed." Moreover, network traffic between the servers 126 and any of compute nodes in the network 100 (i.e., the application servers 128 and 129) is separate from the remote server application program traffic between the servers 126 and the client workstation 102.

Once the connection is established, network traffic between the client workstation 102 and a server 126 is encrypted and may be sent using a remote access application server display protocol such as the ICA protocol. It should be appreciated that for security purposes, IPSec policies may be applied on the servers 126 to restrict the type of network traffic communicated between the client workstation 102 and the servers 126. Before a user's session is accepted and serviced by a server 126, the METAFRAME servers 126 (also known as a server farm) are contacted by the remote access client application program (i.e., the ICA client application). As discussed above in the description of FIG. 1, the servers 126 service client requests by load balancing. For instance, each of the servers 126 may be designed to service 10 to 15 concurrent users. Moreover, in accordance with the various embodiments of the invention and as will be discussed in greater detail below, each of the servers 126 is configured with custom memory settings to accommodate high display resolutions on dual screen monitors associated with the client workstation 102.

The routine 300 continues form operation 340 to operation 345 where a load-balanced METAFRAME server 126 authenticates the user who previously selected the application program in operation 330 and 335, by receiving a set of credentials for accessing the application servers 128 and 129. Once the credentials are supplied, they are validated by an information service such as the LINUX Network Information Service ("NIS"). Then the request for the user-selected application is submitted to the grid engine applications 130 on the application servers 128 and 129.

The routine 300 continues from operation 345 to operation 350 where the grid engine applications 130 determine a least utilized compute node (i.e., a least utilized application server among the servers 128 and 129) for executing the user-selected application program. As discussed above in the description of FIG. 1, the grid engine applications 130 functionality include continually monitoring the compute nodes for processor, memory, network, disk, and input/output utilization. It should be understood that in the embodiments of the invention, each requested command to invoke a process (such as running an application) is intercepted by a designated grid master server in the servers 128 and 129, and then based on an algorithm provided by the grid engine applications 130, the requested command is shunted to the least utilized compute node in its pool. For instance, the request may be shunted to the third compute node in a pool of twenty compute nodes. It should be appreciated that separate grid queues may be defined by group to control which applications and related processes will be executed on which compute nodes. It should also be appreciated that the compute nodes may belong to multiple grid groups. After the user-selected application is executed on the selected compute node, the compute node communicates directly with the appropriate load-balanced METAFRAME server 126 and rasterizes images generated by the application on the METAFRAME server 126.

The routine 300 then continues from operation 350 to operation 355 where the METAFRAME server 126 packages the images generated by the application running on the selected compute node into a remote access server application protocol such as the CITRIX ICA protocol. The routine 300 then continues from operation 355 to operation 360 where the METAFRAME server 126 enables the images to be displayed as high resolution images on the client workstation 102 via the remote access (e.g., ICA) client application program 104. In particular, METAFRAME server 126 enables the display of high resolution images as a result of user-modified memory parameter settings in the registry file 230 (see FIG. 2) for terminal services utilized on the client workstation 102 to provide high resolution support for at least 1920 by 1200 resolution color monitors capable of displaying at least 32 bit or true color. In one embodiment of the invention, the terminal services may be provided by the WINDOWS Terminal Services application (provided in the WINDOWS 2000 ADVANCED SERVER and WINDOWS SERVER 2003 operating systems). It should be understood that, according to one embodiment, high resolution support may be enabled by running a script file on the METAFRAME servers 126 to add certain settings in the registry which will allow the terminal services to use more memory. The modified settings in the registry enable the remote access server application program (e.g., CITRIX ICA server) to use the additional memory and generate high resolution images in a window generated by the remote access client application program (e.g., CITRIX ICA client) for display on one or more monitors associated with a client workstation. The routine 300 then ends.

In accordance with one embodiment, the memory necessary for displaying high resolution images in an ICA client session may be determined by the following formula:

(# of Monitors)×(Horizontal Resolution×Vertical Resolution (in pixels) per monitor)×(ICA connection color depth (in bits)/(8192 kilobytes)
=Required memory in Kilobytes where the ICA connection color depth may include 4 bit color, 8 bit color 16 bit or "high" color, and 24 bit or "true"

color and where 8192 kilobytes represents the conventional memory limit for a terminal services application.

Large memory support may be configured in the METAFRAME server 126 by allocating memory from a kernel global memory pool which is larger than the maximum memory allocated in a logical video buffer for the terminal services application. For instance, large memory support may be enabled in CITRIX by adding and changing/modifying large memory settings "Twconfig.exe" and "Keysync.exe." Twconfig.exe is a CITRIX command line utility that allows for CITRIX configuration outside of the CITRIX Command Console. Keysync.exe is a WINDOWS® command that inserts new keys into the registry and syncs the different operating system shells. Memory parameters and illustrative settings for Twconfig.exe and Keysync.exe are shown below:

Twconfig.exe

New parameters:

/LARGEMEMSIZE:nnn—Maximum special large memory size (in kilobytes) to use for each session's graphics.

/LARGEMEMNUM:nnn—Number of sessions that can use special large memory

Example:

Twconfig/LargeMemSize: 26500/LargeMemNum:3

Keysync.exe

Example:

Keysync MaxLargeLVBMemSize/value: 27136000

Keysync MaxLargeLVBMemNum/value: 3

Referring now to FIG. 4, a computer generated display of a website 400 for selecting an application program generated by the load-balanced Web servers 124, is shown in accordance with an illustrative embodiment of the invention. The website 400 includes a list of applications 410 which may be selected by a user, such as the "Emerald City Linux" application 420. As discussed above in FIG. 3, the applications in the list 410 are stored on and executed from the application servers 128 and 129. Furthermore, the selection of an application from the list 410 invokes a launch script for initiating a connection between the METAFRAME server 126 and a least utilized node among the application servers 128 and 129 for executing the selected application program.

Referring now to FIG. 5, a computer generated display of a menu 500 for selecting Projects 510, Data 520, Applications 530, and Utilities 540 associated with the suite of applications 420 (in FIG. 4), after the application suite 420 has been selected. The menu 500 is displayed on the client workstation 102 via the remote access client application program 104 in a seamless window. It should be understood that in accordance with one embodiment of the invention, the window displaying the menu 500 may be seamlessly displayed across both of the monitors 105 and 106 associated with the client workstation 102.

Based on the foregoing, it should be appreciated that the various embodiments of the invention include a methods, systems, and computer-readable media for displaying high resolution content related to the exploration and production of geologic resources in a thin client computer network. It will be apparent by those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method for displaying high resolution content generated by a securely hosted application program for the exploration and production of geologic resources on a client system in a thin client/server computer network, comprising:
    presenting an interface for accessing the application program, the application program hosted on the server;
    receiving a selection of the application program;
    determining a least utilized node in the client/server computer network for executing the selected application program via the client system;
    packaging images generated by the executed application program into a remote access application server display protocol; and
    displaying the images generated by the executed application program via the remote access application server display protocol as high resolution images on the client system, wherein displaying the images generated by the executed application program via the remote access application server display protocol as high resolution images on the client system comprises receiving a modification of at least one setting on a remote access application server to enable the display of the high resolution images on the client system and wherein receiving a modification of at least one setting on a remote access application server to enable the display of the high resolution images on the client system comprises receiving a modification of at least one registry setting on the remote application server, wherein the at least one registry setting includes a memory parameter setting for a terminal service utilized on the client system.

2. The method of claim 1, wherein displaying the images generated by the executed application program into a remote access application server display protocol as high resolution images on the client system comprises displaying the images in a window comprising a resolution of at least 1920×1200 on a single display associated with the client system.

3. The method of claim 1, wherein displaying the images generated by the executed application program via the remote access application server display protocol as high resolution images on the client system comprises displaying the images on a plurality of displays associated with the client system.

4. The method of claim 1 further comprising:
    presenting a login screen for receiving credentials for accessing the application program;
    receiving logon credentials;
    authenticating the logon credentials; and
    authorizing and customizing a previously stored web page based on the logon credentials.

5. The method of claim 4 further comprising:
    connecting a user session with a remote access application server; and
    authenticating the user via the remote access application server.

6. A system for displaying high resolution content generated by a securely hosted application program for the exploration and production of geologic resources in a thin client computer network, comprising:
    a first server computer operative to:
        present an interface for accessing the application program; and
        receive a selection of the application program; a second server computer operative to:
        determine a least utilized node in the computer network for executing the selected application program a client system; and
    a third server computer operative to:

package images generated by the executed application program into a remote access application server display protocol; and display the images generated by the executed application program via the remote access application server display protocol as high resolution images on the client system; and receive a modification of at least one registry setting, wherein the at least one registry setting includes a memory parameter setting for a terminal service utilized on the client system.

7. The system of claim 6, wherein the third server computer is further operative to display the images in a window comprising a resolution of at least 1920×1200 on a single display associated with the client system.

8. The system of claim 6, wherein the third server computer is further operative to display the images on a plurality of displays associated with the client system.

9. A computer-readable medium having computer-executable instructions stored thereon which, when executed by a computer, will cause the computer to perform a method for displaying high resolution content generated by a securely hosted application program for the exploration and production of geologic resources on a client system in a thin client/server computer network, the method comprising:

presenting an interface for accessing the application program, the application program hosted on the server;

receiving images generated by the application program;

determining a least utilized node in the thin client/server computer network for executing the selected application program via the client system;

packaging the images into a remote access application server display protocol; and displaying the received images generated by the application program as high resolution images on the client system, wherein displaying the images generated by the executed application program as high resolution images on the client system comprises receiving a modification of at least one setting on a remote access application server to enable the display of the high resolution images on the client system and wherein receiving a modification of at least one setting on a remote access application server to enable the display of the high resolution images on the client system comprises receiving a modification of at least one registry setting on the remote application server, wherein the at least one registry setting includes a memory parameter setting for a terminal service utilized on the client system.

10. The computer-readable medium of claim 9, wherein displaying the received images generated by the application program as high resolution images on the client system comprises displaying the images in a window comprising a resolution of at least 1920×1200 on a single display associated with the client system.

11. The computer-readable medium of claim 9, wherein displaying the images generated by the executed application program as high resolution images on the client system comprises displaying the images on a plurality of displays associated with the client system.

* * * * *